United States Patent [19]

De Haeck

[11] 4,066,478
[45] Jan. 3, 1978

[54] BASIC AGGLOMERATED FLUX WITH A HIGH CAO CONTENT FOR THE WELDING OF ORDINARY OR LOW ALLOY STEELS

[75] Inventor: Robert Jean De Haeck, St. Pieters-Kapelle, Belgium

[73] Assignee: La Soudure Electrique Autogene, Procedes Arcos, S.A., Brussels, Belgium

[21] Appl. No.: 749,837

[22] Filed: Dec. 13, 1976

[30] Foreign Application Priority Data

Dec. 18, 1975 Belgium ................... 162851

[51] Int. Cl.$^2$ ............................................ B23K 35/24
[52] U.S. Cl. ..................................................... 148/26
[58] Field of Search ............................................. 148/26

[56] References Cited

U.S. PATENT DOCUMENTS

| | | | |
|---|---|---|---|
| 3,201,292 | 8/1965 | Miltschitzky | 148/26 |
| 3,328,212 | 6/1967 | Coless | 148/26 |
| 3,340,105 | 9/1967 | Ballass | 148/26 |
| 3,704,744 | 12/1972 | Halley | 148/26 |
| 3,826,695 | 7/1974 | Leicher | 148/26 |
| 3,959,031 | 5/1976 | More | 148/26 |

FOREIGN PATENT DOCUMENTS 1,258,799   12/1971   United Kingdom ............... 148/26

*Primary Examiner*—P.D. Rosenberg
*Attorney, Agent, or Firm*—Alexis Barron

[57] ABSTRACT

A prefused basic flux composition comprising:

| | | | | |
|---|---|---|---|---|
| $SiO_2$ | about | 25 | to about | 35% |
| $Al_2O_3$ | about | 2 | to about | 6% |
| $TiO_2$ | about | 3 | to about | 7% |
| $CaF_2$ | about | 5 | to about | 11.25% |
| $CaO$ | about | 44 | to about | 52% |
| $MgO$ | about | 1 | to about | 10% |
| $MnO$ | about | 0.5 | to about | 5% |
| $Na_2O$ | about | 4.5 | to about | 8% |
| $K_2O$ | about | 0.5 | to about | 1.5% |
| $FeO$ | | 0 | to about | 2% | and wherein the weight ratio of CaO to $CaF_2$ is equal to or greater than about 4.

8 Claims, No Drawings

BASIC AGGLOMERATED FLUX WITH A HIGH CaO CONTENT FOR THE WELDING OF ORDINARY OR LOW ALLOY STEELS

FIELD OF THE INVENTION

The present invention relates to basic fluxes for use in welding ordinary or low-alloy steels by the submerged arc welding process (or flux-welding process) in which the major part, or even the entirety, of the flux consists of molten flux.

The basic flux of the present invention can be used in the welding of steels having high elastic limits at elevated or low temperatures and under welding conditions which include, for example, the use of alternating current, high levels of intensity, for example, 1,000 amp for 4.8 mm diameter wire, and conventional rates of speed.

REPORTED DEVELOPMENTS

Welding processes in which a basic flux is used are designed to prevent oxidation or other undesirable change in the metal during the welding operation by use of a covering of powdered flux instead of a protective barrier of neutral gas such as used in tungsten inert gas welding (TIG) and metal inert gas welding (MIG). Compared to the aforementioned, a welding process in which a basic flux is used is in general more economical and easier to effect.

Basic fluxes in general contain CaO to achieve the benefit of its well known metallurgical properties. For example, it has been reported that the "oxidizing intensity of a basic CaO flux (basicity about 3) was equivalent to that of an atmosphere of nitrogen plus 3 to 5% oxygen, as frequently used in MIG welding" (see P. Colvin — "Base Submerged Arc Welding Fluxes", Submerged Arc Welding Institute Meeting, September 69).

The use of basic fluxes having very high contents of CaO and other basic oxides such as, for example, MgO, MnO, $Na_2O$ and $K_2O$, is, however, a delicate matter because they render the flux hygroscopic. It is believed that the highest content of such oxides in basic fluxes is at present about 50% (see British patent specification No. 1,258,799).

It is an object of the present invention to provide an improved basic flux for use in the submerged arc welding of ordinary or low-alloy steels.

SUMMARY OF THE INVENTION

In accordance with the present invention, there is provided an improved basic flux composition in which all of the constituents of the group CaO, MnO, MgO, $Na_2O$ and $K_2O$ comprise over 50% of the total weight of the flux powders and in which the ratio of CaO to $SiO_2$ is greater than one (between about 1.25 and about 2). In contrast to what is disclosed in Belgian Pat. Nos. 680,283 and 823,898, the composition of the present invention makes it possible to deposit beads having very high characteristics utilizing welding conditions which include the use of alternating current and good rates of speed.

DETAILED DESCRIPTION OF THE INVENTION

The granular or powdery flux composition of the present invention can be obtained by initially melting basic mixtures of $SiO_2$, $Al_2O_3$, $TiO_2$, $CaF_2$, CaO, MgO, oxides of Mn, $Na_2CO_3$, and $K_2CO_3$, and optionally Fe oxides, in grains of any appropriate size. The aforementioned ingredients are used in amounts such that the solidified molten mixture, that is, the prefused composition, comprises in weight %, based on the total weight of the solidified mixture, the following:

| | | | | |
|---|---|---|---|---|
| $SiO_2$ | about | 25 | to about | 35% |
| $Al_2O_3$ | about | 2 | to about | 6% |
| $TiO_2$ | about | 3 | to about | 7% |
| $CaF_2$ | about | 5 | to about | 11.25% |
| CaO | about | 44 | to about | 52% |
| MgO | about | 1 | to about | 10% |
| MnO | about | 0.5 | to about | 5% |
| $Na_2O$ | about | 4.5 | to about | 8% |
| $K_2O$ | about | 0.5 | to about | 1.5% |
| FeO | | 0 | to about | 2% | and wherein the weight ratio of CaO to $CaF_2$ is equal to or greater than about 4. The prefused composition can be crushed or pulverized to desired particle size.

The flux composition of the present invention can also contain one or more of $CaCO_3$, $CaF_2$ or other fluorinated fluidizer, and an ionizing ingredient such as, for example, potassium titanate. Each of these ingredients can be used in amounts of up to 5 parts by weight per 100 parts by weight of the aforementioned prefused composition. These ingredients, when used, are added to the prefused composition.

The flux composition of the present invention can be used with both direct and alternating current.

EXAMPLE

This example is illustrative of the present invention. The following prefused composition was prepared by initially melting the constituents and thereafter solidifying and pulverizing the cooled composition.

| | Parts by Weight |
|---|---|
| $SiO_2$ | 33.1 |
| $Al_2O_3$ | 3.1 |
| $TiO_2$ | 3.5 |
| $CaF_2$ | 9.5 |
| CaO | 44.0 |
| MgO | 1.1 |
| MnO | 0.5 |
| $Na_2O$ | 4.5 |
| $K_2O$ | 0.5 |
| FeO | 0.2 |

To the above described prefused composition, there were added the following: 2.5 parts of $CaCO_3$; 1.2 parts of $CaF_2$; and 0.8 part of potassium titanate.

In a submerged arc welding process using low-alloy steel wires of 4 mm diameter and the basic flux described above, it was possible to deposit at the rate of 40 cm/min (at 550 amp 30 V) weld beads, of which the Charpy V-notch toughness of the weld metal (undiluted) was on the order of:

20 kg/sq cm at 0° C
15 kg/sq cm at −20° C
10 kg/sq cm at −40° C
6 kg/sq cm at −60° C.

I claim:
1. A prefused basic flux for submerged arc welding, under both alternating and direct current, of steels of high elastic limits, consisting essentially of, in weight %:

| | | | | |
|---|---|---|---|---|
| $SiO_2$ | about | 25 | to about | 35% |
| $Al_2O_3$ | about | 2 | to about | 6% |
| $TiO_2$ | about | 3 | to about | 7% |

| | | | | |
|---|---|---|---|---|
| CaF$_2$ | about | 5 | to about | 11.25% |
| CaO | about | 44 | to about | 52% |
| MgO | about | 1 | to about | 10% |
| MnO | about | 0.5 | to about | 5% |
| Na$_2$O | about | 4.5 | to about | 8% |
| K$_2$O | about | 0.5 | to about | 1.5% |
| FeO | | 0 | to about | 2% | wherein the weight ratio of CaO to CaF$_2$ is equal to or greater than about 4.

2. A flux according to claim 1 including one or more of CaCO$_3$, fluorinated fluidizer and an ionizing ingredient in an amount of up to about 5 parts by weight of each of the aforementioned per 100 parts by weight of said flux of claim 1.

3. A flux according to claim 2 wherein said fluorinated fluidizer is CaF$_2$ and said ionizing ingredient is potassium titanate.

4. A flux according to claim 3, consisting essentially of, in parts by weight:

| | |
|---|---|
| SiO$_2$ | 33.1 |
| Al$_2$O$_3$ | 3.1 |
| TiO$_2$ | 3.5 |
| CaF$_2$ | 9.5 |
| CaO | 44.0 |
| MgO | 1.1 |
| MnO | 0.5 |
| Na$_2$O | 4.5 |
| K$_2$O | 0.5 |
| FeO | 0.2 |
| CaCO$_3$ | 2.5 |
| CaF$_2$ | 1.2 |
| potassium titanate | 0.8. |

5. In a submerged arc welding process in which ordinary or low-alloy steels are welded utilizing a basic flux, the improvement comprising utilizing the flux of claim 1.

6. In a submerged arc welding process in which ordinary or low-alloy steels are welded utilizing a basic flux, the improvement comprising utilizing the flux of claim 2.

7. In a submerged arc welding process in which ordinary or low-alloy steels are welded utilizing a basic flux, the improvement comprising utilizing the flux of claim 3.

8. In a submerged arc welding process in which ordinary or low-alloy steels are welded utilizing a basic flux, the improvement comprising utilizing the flux of claim 4.

* * * * *